Nov. 12, 1935.  A. O. YOE  2,020,629
ADJUSTABLE BRIDGE FOR BIFOCAL LENSES
Filed Feb. 1, 1935  2 Sheets-Sheet 1
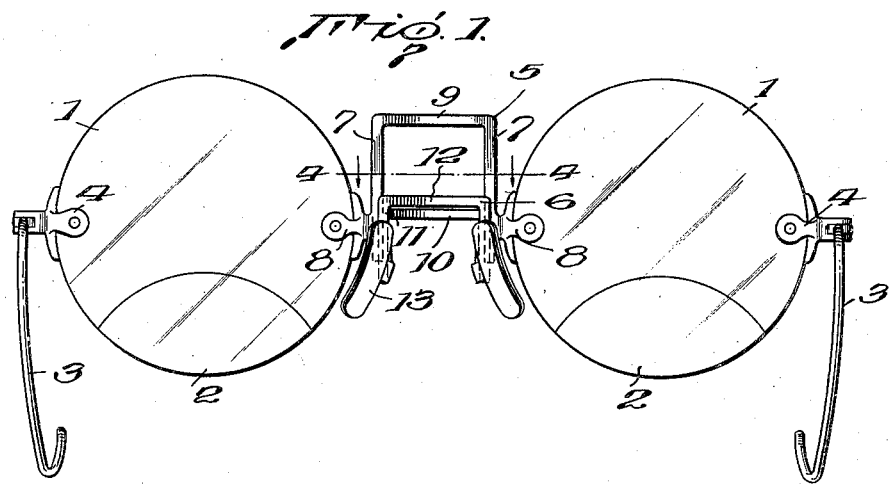
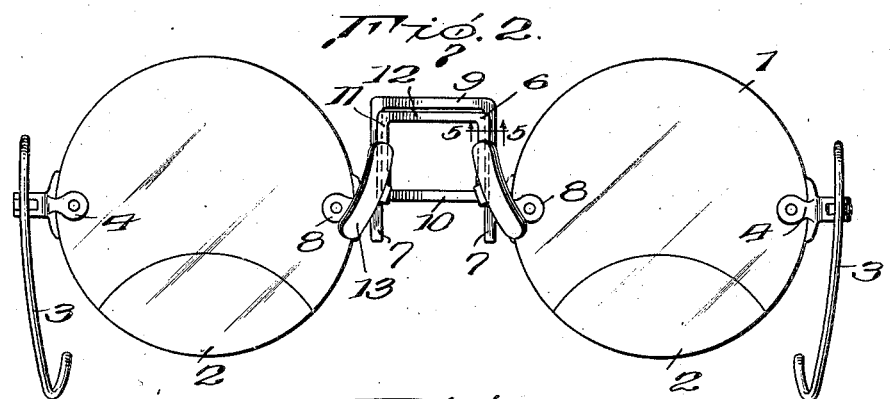
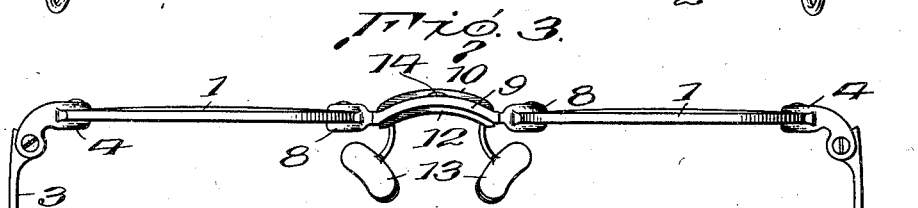
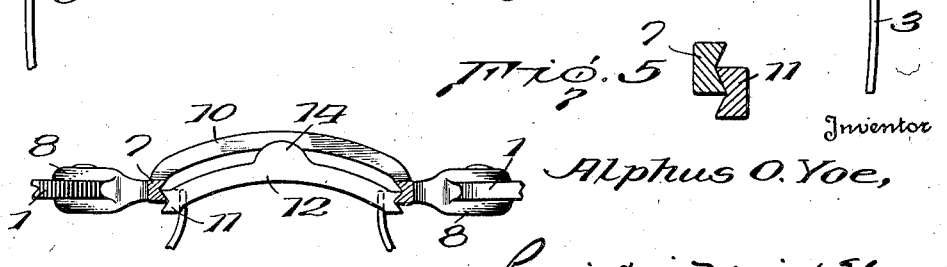
Inventor
Alphus O. Yoe,
By Pennie Davis Marvin & Edmonds
Attorneys Nov. 12, 1935.  A. O. YOE  2,020,629
ADJUSTABLE BRIDGE FOR BIFOCAL LENSES
Filed Feb. 1, 1935    2 Sheets-Sheet 2
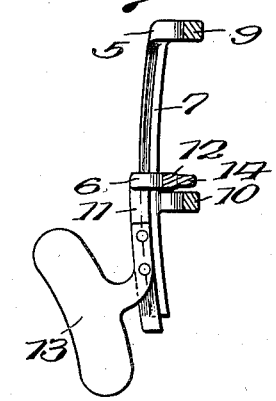
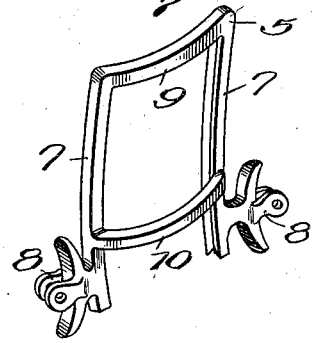
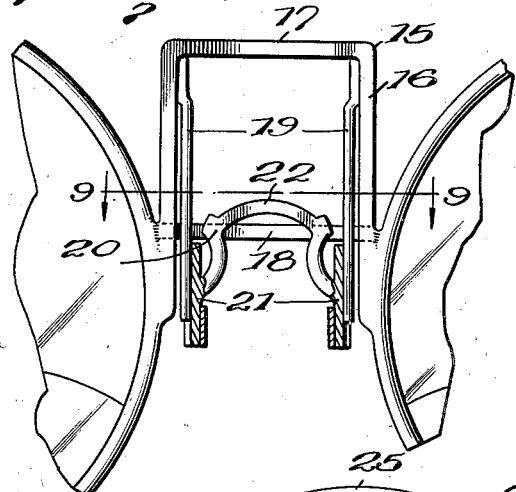
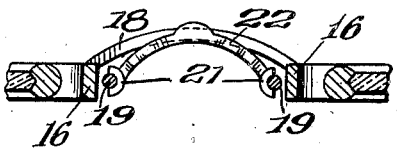
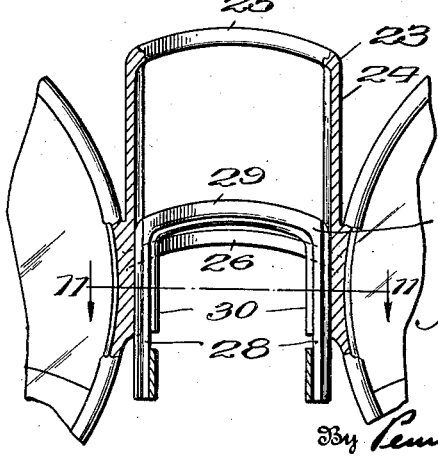
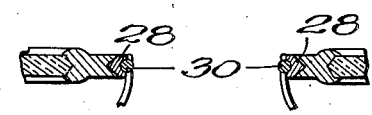
Inventor
Alphus O. Yoe,
By Pennie Davis Marvin Edmunds
Attorney Patented Nov. 12, 1935

2,020,629

REISSUED

UNITED STATES PATENT OFFICE 2,020,629

ADJUSTABLE BRIDGE FOR BIFOCAL LENSES

Alphus O. Yoe, Talladega, Ala.

Application February 1, 1935, Serial No. 4,566

12 Claims. (Cl. 88—49)

This invention relates to spectacles or eyeglasses, and particularly to an adjustable nose bridge for use with bifocal lenses.

Bifocal lenses such as are used in spectacles and eyeglasses were originally made by cementing into the lower portion of the rims a lens having a different focal length from the upper portion. More recently it has become the general practice to form both lenses from a single piece of optical glass and to grind the lower portion thereof so that it has a different focal length from the upper portion of the lens. Such lenses present a more sightly appearance, as the line where the separate lenses of different foci were cemented together is eliminated.

Bifocal lenses as now commonly made have the lens of shortest focus, generally termed the reading lens, at the bottom, and the lens of longest focus, or the distance lens, at the top. As the distance lens is the one normally used and the reading lens is used only when one is reading, it is the usual practice to make the distance lens of a larger area than the reading lens and when the glasses are worn it lies opposite the lens of the eye and imparts no additional strain on the eye due to its position with respect to the lens of the eye. However, the reading lens lies below the level of the lens of the eye, which necessitates that the wearer, when reading, look downward, so that the angle of vision is not normal and additional strain is placed upon the eye.

It has heretofore been proposed to overcome the above objection to the use of bifocal lenses by providing a nose bridge which might be shifted in either of two positions, so as to bring either the reading lens or the distance lens opposite the lens of the eye of the wearer, so that no additional strain is placed upon the eyes, regardless of which lens is being used. Such proposals, while satisfactory from the standpoint of eliminating additional eye strain due to an abnormal angle of vision, have been objectionable in that it has been necessary to remove the eyeglasses or spectacles from the face in order to adjust the bridge to bring the other lens opposite the lens of the eye.

With the above and other considerations in mind, it is proposed by the present invention to provide an adjustable nose bridge for use with bifocal lenses which may be adjusted readily to bring either lens opposite the lens of the eye, without removing the eyeglasses or spectacles from the face, and which will be of relatively simple structure and present a sightly appearance. More particularly, the present invention comprises a bridge piece carrying the usual nose pads at its lower end and a member which is secured rigidly to and connects the inner edges of the lenses and is slidably mounted with respect to the member carrying the nose pads. The two members bear against each other, or an interposed spring member, with sufficient force to cause them to be retained frictionally in either of their adjusted positions. However, the members may be shifted relative to each other merely by overcoming the friction between the respective parts.

In order that the lenses may be shifted upwardly or downwardly while the spectacles or eyeglasses are on the face of the wearer, the member rigidly attached to the lenses preferably comprises a pair of spaced, horizontally-extending bars, or one bar and a projection extending horizontally from one or both sides of said member, and the member which carries the nose pads has a horizontally-extending bar located between the spaced bars of the slidable member. With such an arrangement, to shift the relative position of the lenses it is only necessary that the cross bar of the pad-carrying member and one of the cross bars of the member which carries the lenses be engaged with the thumb and index finger and sufficient force exerted on them to overcome the sliding friction between the parts to cause the cross bar of the lens-carrying member which has been gripped to move towards the cross bar of the nose-pad-carrying member. If the lenses are in the normal position with the distance lenses opposite the lenses of the eye, and it is desired to shift them to bring the reading lenses opposite the lenses of the eye, the lower cross bar of the lens-carrying member is engaged with the thumb and the cross bar of the pad-carrying member is engaged with the index finger. When the parts are then pinched together the lens-carrying member slides upwardly on the pad-carrying member and the lenses are raised to a position where the reading lens lies opposite the eye. If it is subsequently desired to shift the lenses back for distance vision the cross bar of the pad-carrying member is engaged with the thumb and the upper bar of the lens-carrying member engaged with the index finger. When the parts are then pinched together the lens-carrying member slides downwardly on the pad-carrying member and the distance lenses are again brought opposite the lenses of the eye.

The invention will be further described in connection with the accompanying drawings, but it is to be understood that such further disclosure is by way of an exemplification and that the invention is not limited thereby, and is only limited to the extent set forth in the subjoined claims.

In the drawings:

Fig. 1 is an elevational view of a pair of spectacles embodying the invention, being viewed from the side through which the wearer looks and showing the bridge adjusted to the position so that the lower lens will be opposite the lens of the eye.

Fig. 2 is a similar view to Fig. 1, with the bridge adjusted so that the upper lens is brought opposite the lens of the eye.

Fig. 3 is a plan view of Figs. 1 and 2.

Fig. 4 is a horizontal cross-sectional view taken on line 4—4 of Fig. 1.

Fig. 5 is a detail cross-sectional view taken on line 5—5 of Fig. 2.

Fig. 6 is a vertical sectional view through the adjustable bridge.

Fig. 7 is a perspective view of that portion of the bridge to which the lenses are secured.

Fig. 8 is an elevational view partly in section of a modified form of adjustable bridge.

Fig. 9 is a cross-sectional view taken on line 9—9 of Fig. 8.

Fig. 10 is an elevational view partly in section of another modified form of adjustable bridge, and Fig. 11 is a cross-sectional view taken on line 11—11 of Fig. 10.

Referring to the drawings, and first to the embodiment of the invention shown in Figs. 1 to 7, the adjustable bridge is shown as applied to spectacles having bifocal lenses having upper and lower lens portions 1 and 2 which are ground to have different foci. As is usual in bifocal lenses, the upper lenses 1 normally lie opposite the lenses of the eye and are ground to have a longer focal length than the lower lenses 2 and are adapted for distant vision. The lenses 2 are ground to have a shorter focal length and are the normal reading lenses. Temple bars 3 are secured to the outer edges of the lenses by means of the usual lens straps 4.

The adjustable bridge comprises two relatively slidable parts 5 and 6. The part 5 comprises a pair of vertically extending bars 7 which carry adjacent their lower ends lens straps 88 for securing the bridge part 5 rigidly to the respective lenses. The vertically extending bars 7 are connected together by a pair of vertically spaced, horizontally extending cross-bars 9 and 10, one of which preferably connects the upper ends of the vertical bars 7 and the other of which extends between said bars in the region of the lens straps 8. In order that the bridge member 5 may generally conform to the contour of the wearer's face when the spectacles are being worn, the upwardly extending bars 7 are preferably curved longitudinally outwardly so that they will lie close to that portion of the face where the upper part of the nose joins the lower portion of the forehead, and the horizontally extending cross-bars 9 and 10 are curved outwardly to better fit around the bridge of the nose.

The bridge member 6 preferably comprises a generally U-shaped member having vertically extending legs 11 and a cross-bar 12 connecting their upper ends and curved outwardly in the same manner as the cross-bars 9 and 10 of the member 5 to generally conform to the shape of the wearer's nose. Bridge pads 13, adapted to bear against opposite sides of the nose and to support the spectacles upon the face, are carried by the respective legs 11 of the U-shaped member 6.

In order that the bridge members 5 and 6 may readily slide relative to one another, the inner sides of the vertically extending bars 7 and the outer sides of the legs 11 of the U-shaped member are provided with complementary frictionally-engaging track portions. The particular shape of the complementary track portions of the bars 7 and legs 11 may take various forms. In this particular embodiment of the invention, each is of general V-shape and arranged in partially overlapping relation as shown in Fig. 5, and with the U-shaped member 6 extending slightly inwardly from the vertically extending bars 7 of the member 5. The outer sides of legs 11 of the member 6 bear against the inner sides of the vertically extending bars of the member 5 with sufficient force to normally cause the members 5 and 6 to be held in any relative position; yet they may be slid relative to one another merely by overcoming the friction between them. There are no latches or catches which must be disengaged before they may be shifted to a different position of adjustment.

The cross bar 12 of the U-shaped member 6 lies between the vertically spaced cross bars 9 and 10 of the member 5 and has a finger piece 14 extending forwardly a distance sufficient to lie in a plane passing through said bars.

In Fig. 2 the spectacles are shown with the parts 5 and 6 shifted so that the upper or distance lenses 1 would lie opposite the lenses of the eyes when the spectacles are placed upon the face. If it should be desired to shift the spectacles to the position shown in Fig. 1 in which the lower or reading lenses 2 would be positioned opposite the lenses of the eyes, it would only be necessary that the thumb be placed beneath the cross bar 10 and the index finger placed above the cross bar 12 and/or its protruding finger piece 14 and the parts then pinched towards each other. When that is done the member 5 will slide upwardly on the legs 11 of the member 6 and the parts will be shifted to the desired position of adjustment with the reading lenses opposite the lenses of the eyes, and the wearer may use the spectacles for reading purposes without subjecting the eyes to additional strain caused by an abnormal angle of vision.

If it should subsequently be desired to again shift the relative positions of the lenses 1 and 2 so that the distance lenses 1 would again lie opposite the lenses of the eyes, it would only be necessary that the thumb be placed beneath the cross bar 12 and/or its protruding finger piece 14, and the index finger placed above the cross bar 9, and the parts pinched towards each other. The member 5 will then be caused to slide downwardly on the legs 11 of the member 6 and the bridge members again brought into the position shown in Fig. 2.

It will be noted that in adjusting the relative positions of the members 5 and 6 to bring either the distance or the reading lenses opposite the lenses of the eyes, it is not necessary that the spectacles be removed from the face, and due to the frictional engagement of the legs 11 of the U-shaped member 6 with the vertical bars 7 of the member 5 the members will be maintained in either of their positions of adjustment.

In Figs. 8 and 9 a modified form of the invention is shown in which the bridge member 15 has a pair of vertically extending bars 16 and a pair of vertically spaced, horizontally extending, connecting cross-bars 17 and 18. Track members 19 in the form of resilient springs are attached to the bars 16 of the member 15 in such manner that they have at least one free end. While, as shown in Fig. 8, the spring track members 19 are brazed or otherwise secured at their upper ends to the inner sides of the bars 16, the spring track members may, if desired, be secured at a mid-point and have both their upper and lower ends free. The spring tracks 19 may have any desired cross sectional shape, but are preferably circular in cross section as is shown in Fig. 9.

The nose-pad carrying member 20, like the corresponding member in the embodiment shown in Figs. 1 to 7, comprises a pair of vertically extending bars 21 having track sections at their outer sides complementary to the spring track members 19, and a cross bar 22 connecting the vertically extending bars 21 and positioned between the cross-bars 17 and 18 of the bridge member 15.

The free ends of the spring track members 19 are sprung inwardly so that they bear against the complementary track portions of the bars 21 with sufficient friction to retain the members 15 and 20 in any relative position of adjustment.

The manner of shifting the members 15 and 20 relative to one another to position either the distance or reading lenses opposite the lenses of the eye is the same as has been described above in connection with the first embodiment of the invention.

In Figs. 10 and 11 a still further modification of the invention is shown, and in those figures the bridge member 23 has vertically extending bars 24 having track portions on their inner sides, and vertically spaced, horizontally extending connecting cross-bars 25 and 26. The nose-pad carrying member 27 is generally similar to the member 6 disclosed in Figs. 1 to 7, and comprises vertically extending bars 28 and the horizontal bar 29 connecting the outer ends of the bars 28. As is more clearly shown in Fig. 11, the track formed on the inner sides of the vertically extending bars 24 is V-shaped, and the bars 28 have their outer sides correspondingly V-shaped to fit within the track of the bars 24.

The inner sides of the vertical bars 28 of the member 27 are preferably grooved to receive a reinforcing spring member 30, which normally urged the bars 28 into frictional engagement with the track portions of the bars 24, with sufficient friction to normally maintain the members 23 and 27 in any position to which they may be shifted.

The invention has been particularly described in connection with spectacles, but it is to be understood that it might apply equally as well to eyeglasses, which do not have temple bars for retaining the glasses upon the face of the wearer.

In this specification and in the appended claims the term "nose pads" is used in a broad sense to define those parts of the eyeglasses or spectacles, regardless of their particular structure, which rest upon the nose and support the eyeglasses or spectacles.

I claim:

1. In eyeglasses or spectacles having bifocal lenses, a bridge member having pad portions adapted to bear against opposite sides of the nose and to support the eyeglasses or spectacles upon the face of the wearer, and a second bridge member connected to the respective lenses and slidable vertically with respect to said pad-carrying member to an upper and a lower position, said second member comprising a pair of vertically extending parts, a cross-bar connecting said vertically extending parts and a part vertically spaced from said cross-bar and extending from one vertically extending part towards the other vertically extending part, said pad-carrying member having a cross-bar connecting the pad-carrying parts and positioned between the cross-bar and the vertically spaced part of the second member, whereby the cross-bar of the pad-carrying member and either the cross-bar or the vertically spaced part of the second member may be pinched towards each other to shift the second member into either of its positions of adjustment.

2. In eyeglasses or spectacles having bifocal lenses, a bridge member having pad portions adapted to bear against opposite sides of the nose and to support the eyeglasses or spectacles upon the face of the wearer, and a second bridge member connected to the respective lenses and slidable vertically with respect to said pad-carrying member to an upper and a lower position, said second member comprising a pair of vertically extending parts, a cross-bar connecting said vertically extending parts and a part vertically spaced from said cross-bar and extending from one vertically extending part towards the other vertically extending part, said pad-carrying member having a cross-bar connecting the pad-carrying parts and positioned between the cross-bar and the vertically spaced part of the second member, said members bearing frictionally against each other with sufficient force to hold the members in either position of adjustment, and said members being slidable with respect to one another merely by overcoming the friction between them.

3. In eyeglasses or spectacles having bifocal lenses, a generally U-shaped bridge member having pad portions adapted to bear against opposite sides of the nose and to support the eyeglasses or spectacles upon the face of the wearer, and a second bridge member connected to the respective lenses and slidable vertically with respect to said U-shaped member to an upper and a lower position, said second member having a pair of horizontally spaced, vertically extending bars and a pair of vertically spaced, horizontally extending cross-bars, the cross-bar of the U-shaped member being positioned between the horizontally extending bars of the second member, whereby the cross-bar of the U-shaped member and either cross-bar of the second member may be pinched towards each other to shift the second member into either of its positions of adjustment.

4. In eyeglasses or spectacles having bifocal lenses, a bridge member having pad portions adapted to bear against opposite sides of the nose and to support the eyeglasses or spectacles upon the face of the wearer and comprising a pair of vertically extending bars and a connecting cross bar, a second bridge member connected to the respective lenses and slidable vertically with respect to said pad-carrying member to an upper and a lower position, said second member comprising a pair of horizontally spaced, vertically extending bars and a pair of vertically spaced, horizontally extending bars, the outer sides of the vertically extending bars of the pad-carrying member and the inner sides of the vertically extending bars of the second member having complementary track portions and the track portions of the two members bearing frictionally against each other with sufficient force to hold the members in either of their positions of adjustment, said members being slidable with respect to one another merely by overcoming the friction between them.

5. In eyeglasses or spectacles having bifocal lenses, a bridge member having pad portions adapted to bear against opposite sides of the nose and to support the eyeglasses or spectacles on the face of the wearer, a second bridge member connected to the respective lenses, one of said members having a pair of vertically extending spring track portions carried thereby and spaced therefrom and the other member having portions frictionally engaging said spring track portions, whereby the second member may slide vertically with respect to said pad-carrying member to an upper and a lower position.

6. In eyeglasses or spectacles having bifocal lenses, a bridge member having pad portions adapted to bear against opposite sides of the nose and to support the eyeglasses or spectacles on the face of the wearer, a second bridge member connected to the respective lenses, said second member having a pair of vertically extending spring track portions carried thereby and spaced therefrom and a pad-carrying member having portions frictionally engaging said spring track portions, whereby the second member may slide vertically with respect to said pad-carrying member to an upper and a lower position.

7. In eyeglasses or spectacles having bifocal lenses, a bridge member having pad portions adapted to bear against opposite sides of the nose and to support the eyeglasses or spectacles on the face of the wearer, a second bridge member connected to the respective lenses, said second member having a pair of vertically extending spring track portions carried thereby and spaced therefrom, said spring track portions having at least one free end, and the pad-carrying member having portions frictionally engaging said spring track portions, whereby the second member may slide vertically with respect to said pad-carrying member to an upper and a lower position.

8. In eyeglasses or spectacles having bifocal lenses, a bridge member having pad portions adapted to bear against opposite sides of the nose and to support the eyeglasses or spectacles from the face of the wearer, a second bridge member connected to the respective lenses and comprising a pair of vertically extending bars, a cross-bar connecting said vertically extending bars and a part vertically spaced from said cross-bar and extending from one vertically extending bar towards the other vertically extending bar, and spring track members carried by the vertically extending bars of the second member, said pad-carrying member having track portions frictionally engaging the spring track portions of the second member and also having a cross-bar connecting the pad-carrying portions positioned between the cross-bar and the vertically spaced part of the second member whereby the cross-bar of the pad-carrying member and either the cross-bar or the vertically spaced part of the second member may be pinched towards each other to cause the spring tracks of the second member to slide with respect to the track portions of the pad-carrying member to shift the second member either to an upper or a lower position.

9. In eyeglasses or spectacles having bifocal lenses, a bridge member having pad portions adapted to bear against opposite sides of the nose and to support the eyeglasses or spectacles upon the face of the wearer, a second bridge member connected to the respective lenses and comprising a pair of vertically extending bars and a pair of vertically spaced, horizontally extending cross-bars connecting said vertically extending bars, spring track members secured to each of the vertically extending bars of said second member, the pad-carrying member having portions frictionally engaging the spring track of said second member and also having a cross-bar connecting the pad-carrying parts positioned between the cross-bars of said second member whereby the cross-bar of the pad-carrying member and either cross-bar of the second member may be pinched towards each other to cause the spring tracks of the second member to slide with respect to the pad-carrying member to shift the second member either into an upper or a lower position.

10. In eyeglasses or spectacles having bifocal lenses, a bridge member having pad portions adapted to bear against opposite sides of the nose and to support the eyeglasses or spectacles upon the face of the wearer, a second bridge member having vertically extending bars to which the lenses are secured, said second member also having a cross-bar connecting said vertically extending bars and a part vertically spaced from said cross-bar and extending from at least one vertical bar towards the other vertical bar, the pad-carrying portion having vertically extending bars frictionally engaging the vertically extending bars of said second member and also having a connecting cross-bar positioned between the cross-bar and the vertically spaced part of the second member, whereby the cross-bar of the pad-carrying member and either the cross-bar or the vertically spaced part of the second member may be pinched towards each other to shift the second member either upwardly or downwardly with respect to the pad-carrying member, and a resilient reinforcing member for holding the vertically extending bars of the pad-carrying member in frictional engagement with the vertically extending bars of the second member with sufficient force to cause the second member to be retained in any position of adjustment with respect to the pad-carrying member.

11. In eyeglasses or spectacles having bifocal lenses, a bridge member comprising a pair of vertically-extending parts and a connecting cross bar, pad portions carried by the vertically-extending parts adapted to bear against opposite sides of the nose and to support the eyeglasses or spectacles upon the face of the wearer, a second bridge member connected to the respective lenses and slidable vertically with respect to said first-mentioned bridge member to an upper and a lower position, said second bridge member comprising a pair of vertically-extending parts frictionally bearing against the vertically-extending parts of the first-mentioned bridge member, a cross-bar connecting said vertically-extending parts and a part vertically spaced from said cross-bar and extending from one vertically-extending part towards the other vertically-extending part, the cross bar of said first-mentioned bridge member being positioned between the cross-bar and the vertically-spaced part of the second member, whereby the cross-bar of the first-mentioned bridge member and either the cross-bar or the vertically-spaced part of the second bridge member may be pinched towards each other to shift the second bridge member into either of its positions of adjustment, and a U-shaped resilient reinforcing member having the legs thereof bearing against the inner sides of the vertically-extending parts of the first bridge member for holding said parts in frictional engagement with the vertically-extending parts of the second bridge member with sufficient force to hold the members in either position of adjustment.

12. In eyeglasses or spectacles having bifocal lenses, a bridge member having pad portions adapted to bear against opposite sides of the nose and to support the eyeglasses or spectacles upon the face of the wearer, a second bridge member connected to the respective lenses and slidable vertically with respect to said pad-carrying member to an upper and a lower position, said second member comprising a pair of vertically-extending parts, a cross-bar connecting said vertically extending parts and a part vertically spaced from said cross-bar and extending from one vertically-extending part towards the other vertically-extending part, said pad-carrying member having a cross-bar connecting the pad-carrying parts and positioned between the cross-bar and the vertically-spaced part of the second member, whereby the cross-bar of the pad-carrying member and either the cross-bar or the vertically-spaced part of the second member may be pinched towards each other to shift the second member into either of its positions of adjustment, the vertically-extending parts of the first bridge member being grooved on their inner edges, and a resilient reinforcing member having parts thereof positioned in said grooves for holding the vertically-extending parts of said bridge member in frictional engagement with the vertically-extending parts of the second bridge member with sufficient force to hold the bridge members in either position of adjustment.

ALPHUS O. YOE.